US012720395B2

(12) United States Patent
Hassan et al.

(10) Patent No.: US 12,720,395 B2
(45) Date of Patent: Aug. 25, 2026

(54) ENHANCED WIRELESS COMMUNICATION HANDOVER MANAGEMENT SYSTEM

(71) Applicant: Microsoft Technology Licensing, LLC, Redmond, WA (US)

(72) Inventors: Amer Aref Hassan, Kirkland, WA (US); Kristofer A. Kraft, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 18/427,053

(22) Filed: Jan. 30, 2024

(65) Prior Publication Data

US 2025/0247758 A1 Jul. 31, 2025

(51) Int. Cl.
*H04W 36/18* (2009.01)
*G10L 15/02* (2006.01)
(Continued)

(52) U.S. Cl.
CPC ............ *H04W 36/18* (2013.01); *G10L 15/02* (2013.01); *G10L 15/183* (2013.01); *G10L 15/22* (2013.01);
(Continued)

(58) Field of Classification Search
CPC ...... H04W 36/18; H04W 36/36; G10L 15/02; G10L 15/183; G10L 15/22; G10L 15/16;
(Continued)

(56) References Cited

U.S. PATENT DOCUMENTS

| | | | |
|---|---|---|---|
| 7,881,448 | B2 | 2/2011 | Boss et al. |
| 9,723,401 | B2 | 8/2017 | Chen |

(Continued)

FOREIGN PATENT DOCUMENTS

| | | | |
|---|---|---|---|
| EP | 2424198 | A2 | 2/2012 |
| EP | 4175316 | A1 | 5/2023 |
| JP | 2017536040 | A | 11/2017 |

OTHER PUBLICATIONS

"Reporting on Talk network and audio quality," Zendesk, Retrieved from <<https://support.zendesk.com/hc/en-us/articles/4408833546522-Reporting-on-network-and-audio-quality-for-voice>> Apr. 12, 2023, 6 Pages.

(Continued)

*Primary Examiner* — Mark Villena

(74) *Attorney, Agent, or Firm* — Schwegman Lundberg & Woessner, P.A.

(57) ABSTRACT

To effectively resolve the issue of inappropriate handovers during communication sessions, methods, systems, and machine-readable mediums which utilize speech features captured by microphones in the original wireless peripheral device and/or the wireless peripheral device to which the communication session is to be handed over to determine if a handover should proceed or should be reversed. Speech features refer to the composite attributes of spoken language that encompass both acoustic and linguistic features. Acoustic features characterize the sound properties of speech and include, but are not limited to, timbre, pitch, intonation, speaking rate, articulation, prosody, melody, spectral features, formant frequencies, and the like. Linguistic features pertain to the actual content conveyed, comprising words, phrases, syntax, and semantics. This includes the analysis of words, phrases, syntax, and semantics to understand the context and continuity of the conversation.

20 Claims, 5 Drawing Sheets

(51) Int. Cl.

| | |
|---|---|
| ***G10L 15/183*** | (2013.01) |
| ***G10L 15/22*** | (2006.01) |
| ***H04M 1/72412*** | (2021.01) |
| ***H04M 3/42*** | (2006.01) |
| ***H04W 36/36*** | (2009.01) |

(52) U.S. Cl.

CPC ... *H04M 1/72412* (2021.01); *H04M 3/42161* (2013.01); *H04W 36/36* (2013.01); *H04M 2201/405* (2013.01); *H04M 2242/12* (2013.01)

(58) Field of Classification Search

CPC ......... G10L 15/18; G10L 15/26; G10L 17/00; G10L 25/51; H04M 1/72412; H04M 3/42161; H04M 2201/405; H04M 2242/12; H04R 3/005; H04R 2420/07; G06F 3/165; G06F 40/20

See application file for complete search history.

(56) References Cited

U.S. PATENT DOCUMENTS

| | | | | |
|---|---|---|---|---|
| 10,244,104 | B1 | 3/2019 | Ireland | |
| 10,735,901 | B2 | 8/2020 | Bostick | |
| 2016/0134966 | A1* | 5/2016 | Fitzgerald | H04R 3/005<br>381/123 |
| 2021/0144498 | A1 | 5/2021 | Yan | |
| 2021/0256979 | A1* | 8/2021 | Zhang | G10L 17/22 |
| 2023/0102049 | A1* | 3/2023 | Oh | G10L 15/20<br>704/200 |
| 2024/0098607 | A1* | 3/2024 | Srinivasan | H04W 36/32 |
| 2025/0131919 | A1* | 4/2025 | Mao | G10L 15/16 |

OTHER PUBLICATIONS

International Search Report and Written Opinion received for PCT Application No. PCT/US2024/060888, mailed on Feb. 4, 2025, 14 pages.

* cited by examiner

ENHANCED WIRELESS COMMUNICATION HANDOVER MANAGEMENT SYSTEM

TECHNICAL FIELD

Embodiments pertain to wireless peripheral devices. Some embodiments relate to enhanced handover decision making algorithms for wireless peripheral devices in communication sessions.

BACKGROUND

Wireless headsets and other wireless peripheral devices have become an integral part of modern communication, providing users with the convenience of hands-free operation and mobility. The evolution of these wireless peripheral devices has been driven by advancements in wireless technology, miniaturization of components, and the increasing demand for seamless integration with various communication platforms.

Traditionally, peripheral devices were attached to a computing device operating the communication application through wired connections, which limited user movement and convenience. The advent of wireless peripheral devices such as wireless headsets, microphones, and the like revolutionized the user experience by eliminating the physical tether to the computing device. This allowed users to move freely while engaging in voice calls, video conferencing, or multimedia consumption. Wireless devices employ various technologies such as Bluetooth, Radio Frequency (RF), Infrared (IR), and more recently, Near Field Communication (NFC) to connect with the primary communication device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
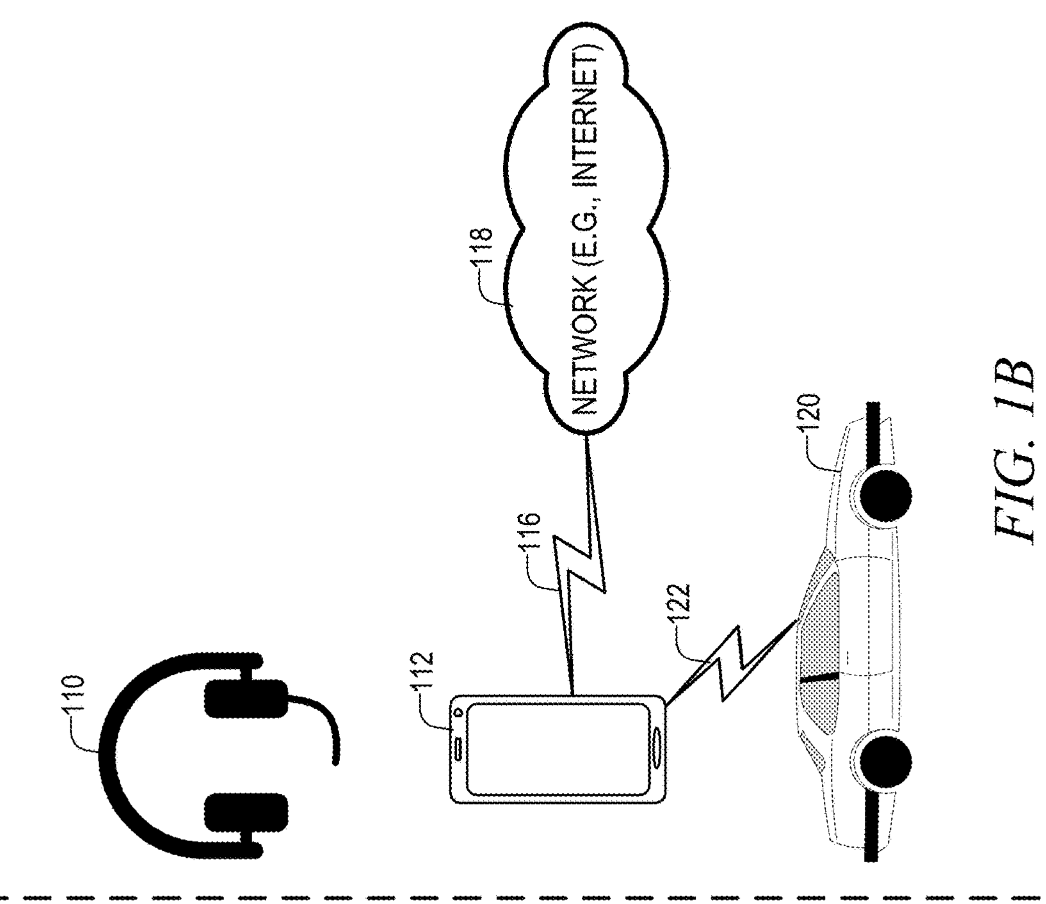
FIGS. 1A-1B illustrates a diagram of an inappropriate handover according to some examples of the present disclosure.

For wireless peripherals to function correctly, seamless connectivity and uninterrupted service are important for ensuring effective communication sessions. However, a persistent problem that plagues users of wireless peripheral devices, such as wireless headsets, is the occurrence of inappropriate handovers during communication sessions. These handovers refer to the unintended transfer of the communication link from one wireless peripheral device to another, which can happen automatically based on certain device protocols or settings.

For example, in environments where multiple wireless peripheral devices are present and paired with the computing device that is executing the communication application, users may experience sudden and unexpected switches of the audio input or output from the intended wireless peripheral (e.g., a wireless headset) to another peripheral (e.g., a nearby wireless speaker or car infotainment system). Such inappropriate handovers can result in the user not being able to hear the other party or, conversely, the other party not being able to hear the user. This disruption can lead to missed information, misunderstandings, and a general degradation of the communication experience.

To effectively resolve the issue of inappropriate handovers during communication sessions, disclosed in some examples are methods, systems, and machine-readable mediums which utilize speech features captured by microphones in the original wireless peripheral device and/or the wireless peripheral device to which the communication session is to be handed over to determine if a handover should proceed or should be reversed. Speech features refer to the composite attributes of spoken language that encompass both acoustic and linguistic features. Acoustic features characterize the sound properties of speech and include, but are not limited to, timbre, pitch, intonation, speaking rate, articulation, prosody, melody, spectral features (e.g., spectral distribution), frequencies (such as formant frequencies), voice onset time, dynamic range, and the like. Linguistic features pertain to the actual content conveyed, comprising words, phrases, syntax, and semantics. This includes the analysis of words, phrases, syntax, and semantics to understand the context and continuity of the conversation.

By analyzing acoustic characteristics such as pitch, timbre, and formant frequencies, the system can detect the user's presence and engagement with a wireless device. For example, a sudden drop in the formant frequencies or a change in timbre might indicate whether the user is speaking at a particular device. In the case of a handover, the user should be speaking at the handover microphone but not the original microphone. An acoustic analysis that indicates that the user is either not at the handover microphone or is still at the original microphone, or both, may indicate that the handover was inappropriate or should be canceled.

In addition, a change in the acoustic features could indicate that, while speech is being detected on the wireless peripheral device to which the session is to be handed over (the handover peripheral device or handover microphone), that speech is not of the original user of the original wireless peripheral device. This may detect instances in which, for example, the session switches to a vehicle infotainment system driven by a family member who begins speaking. In some examples, speech recognition algorithms may be used to determine if the same speaker is captured by the original microphone and the microphone to which the communication is handed over to.

Furthermore, speech profiles may be developed and/or saved for one or more participants of the communication service. These profiles may be based upon acoustic characteristics from previous communication sessions, sampled from the present communication session (e.g., before the handover), or the like. The profiles may be specific to the participant and in some examples, specific to each wireless peripheral device. That is, certain properties of the microphones in each device may cause changes in acoustic features of the speaker. By learning and saving speech profiles for each device, the system may be able to more accurately determine the identity of the speaker. The system may utilize acoustic features to determine if the speaker who was speaking previously on the original peripheral device is now speaking on the handover device, or is still speaking on the original peripheral device.

Instead of, or in addition to, acoustic features, the system may utilize linguistic features of the speech. If the linguistic analysis suggests that the user is actively participating in the communication session on the handover peripheral device—evidenced by coherent syntax and relevant semantics—the system may infer that the handover was successful. Conversely, if the linguistic content becomes disjointed or lacks continuity, it may signal a potential issue with the handover.

In some examples, where the computing device connecting to the wireless peripherals has the ability to maintain multiple wireless connections to multiple wireless peripheral devices at the same time, the system may function to apply additional intelligence to the handover decision process prior to switching to a new audio source. That is, the analysis described herein may be done on both the original and handover microphone audio. Handovers which do not meet the criterion described herein may be canceled and the audio from the original microphone may continue to be used. Conversely, if the handover meets the criterion described herein, the handover may be completed and the radio link to the original device may be terminated and the audio from the handover microphone may be utilized.

By integrating the analysis of acoustic and/or linguistic features, the system can make intelligent and context-aware decisions as to whether to handover to a new peripheral device or whether to remain with, or transfer the connection back-to, the original wireless peripheral device. This approach mitigates disruptions caused by inappropriate handovers and ensures that transitions between devices are made, or maintained, only when they contribute positively to the communication session. The result is a more stable and reliable communication experience, with the user's auditory presence and the intelligibility of speech utilized within the handover process.

The technical problem addressed by the present invention is the occurrence of inappropriate handovers between wireless devices during communication sessions, which can lead to disruptions such as the user not being able to hear or be heard by the other party. This problem arises from the system's blind use of proximity in making handover decisions and thus, the inability to accurately determine the optimal timing and conditions for transferring the communication link based on the user's current engagement and the acoustic environment. The technical solution proposed involves utilizing audio captured by the peripheral devices and analyzing that audio for one or both of acoustic and linguistic features of the user's speech to intelligently manage the handover process. By evaluating acoustic features such as pitch, timbre, and formant frequencies, the system can discern the quality of the audio signal and the user's proximity to the device (rather than simply the user's mobile device's proximity to the wireless device). Concurrently, the analysis of linguistic features, including words, phrases, syntax, and semantics, allows the system to understand the context and continuity of the conversation. This dual analysis enables the system to make context-aware decisions, ensuring that handovers occur only when they are justified by the user's engagement and the acoustic conditions, thereby maintaining the integrity of the communication session and enhancing the user experience.

In order to more intelligently handover to a device, or to detect an inappropriate handover to a device, the system may perform one or more of the following methods. As used herein, the handover microphone or handover device is a microphone or device that is the target of the handover or handover indication. The original microphone or original device is a microphone or device that is the microphone or device used prior to the handover or handover indication.

Linguistic Analysis of Audio from the Handover Microphone. The system employs advanced speech recognition algorithms to analyze the linguistic content captured by the handover microphone. It assesses the presence or absence of key linguistic elements such as vocabulary, syntax, and conversational dynamics. If the analysis reveals a lack of these elements (or a lack of enough of these elements), indicating an absence of conversation, the system interprets this as an inappropriate handover. The system may then automatically revert the communication link to the original device or prompt the user to confirm the desired action.

In some examples, the system incorporates a speech-to-text engine that converts spoken words into written text, enabling the analysis of linguistic content. The speech-to-text engine is trained on a diverse corpus of spoken language to recognize a wide range of dialects and accents. Example speech-to-text engines may be based upon a number of algorithms such as Hidden Markov Models, Deep Neural Networks, Convolutional Neural Networks (CNN), Recurrent Neural Networks (RNN), and the like. The system then applies syntactic parsing to assess sentence structure and employs semantic analysis algorithms to interpret the meaning and context of the conversation. If the text output fails to show coherent linguistic patterns typically associated with conversation, the system flags this as a potential issue, prompting a review of the handover decision. Example syntactic parsing algorithms may include the Cocke-Younger-Kasami algorithm, Earley Parser, Transition-Based Parsing, Graph-Based Parsing, Probabilistic Context-Free Grammers, Lexicalized Parsers. Example semantic analysis algorithms may include Latent Semantic Analysis, Latent Dirichlet Allocation, word embedding algorithms such as Word2Vec, Semantic Role Labeling, generative artificial intelligence models such as Generative Pretrained Transformer (GPT), Bidirectional Encoder Representations from Transformers (BERT), FrameNet, Recurrent Neural Networks, Long Short-Term Memory, Gated Recurrent Units, and the like.

Linguistic Analysis of the Other Party's Speech. In some examples, the system may process the linguistic content of the other party's speech. Utilizing natural language processing techniques, such as those described above for the linguistic analysis of audio from the handover microphone, the system identifies specific phrases or patterns that suggest communication issues, such as repeated questioning or expressions of confusion. Upon detection, the system can initiate a re-evaluation of the handover decision, potentially triggering a reconnection to the original device or offering the user options to resolve the issue. In some examples, this method detects specific phrases or expressions that are commonly used when a communication breakdown occurs. The system may include a library of such phrases and employs pattern recognition to identify them within the speech of the other party. Example phrases may include "hello?" "I can't hear you" or the name of the participant ("Joe?"). Machine learning techniques may be employed in addition to, or instead of a prespecified list to enable the system to adapt and update its library of phrases over time, improving its ability to detect communication issues accurately.

Acoustic Analysis of Handover Microphone. This method involves monitoring of the acoustic features of the sound captured by the handover microphone. In some examples, the system analyzes parameters such as sound intensity, spectral content, energy levels, zero-crossing rates, spectral entropy, and temporal patterns to detect the presence or absence of human speech. An absence of acoustic speech may signal that the handover should be canceled or reversed. Example algorithms used may include voice activity detection (VAD) algorithms, energy-based detection, spectral analysis (which may detect speech using the Short-Time-Fourier Transform to look for patterns of speech such as formant structures), zero crossing rate, and the like.

In some examples, the system may have one or more voice prints of the participant stored—e.g., in a profile of the participant. After handover, the system may utilize one or more voice recognition algorithms to determine if a voice is detected on the handover microphone and if so, whether it matches the stored voice print in the voice profile. If no voice is detected, or the voice that is detected does not match the stored profile, in some examples, the system may determine that there has been an inappropriate handover. Example comparison algorithms may include Gaussian Mixture Models (GMMs), i-vector systems, Deep Neural Networks, Convolutional Neural Networks (CNNs), Recurrent Neural Networks (RNN), Dynamic Time Warping, Support Vector Machines, and the like.

Acoustic Analysis of Original Microphone. If simultaneous wireless connections to multiple peripherals is supported by the computing device executing the communication application, the system may maintain an active connection with the original microphone, allowing for the ongoing analysis of acoustic features from the original microphone of the original wireless peripheral even after a handover has occurred. Should the acoustic features of the original microphone not change a threshold amount between pre and post handoff, the system may conclude that the handover was not appropriate. For example, if the user switches to a different microphone, it would be expected that they orient themselves so as to use the new microphone. This would likely degrade the audio quality at the original microphone. On the other hand, if the user's intention is to continue using the original microphone, the audio signal from the original microphone is unlikely to change. In sum, if original microphone continues to capture the user's voice with clarity and consistency, the system deduces that the user is still best served by the original device. The system may then take steps to restore the communication link to the original microphone or provides the user with options to manage the handover. In some examples, the system continuously samples the acoustic signal from the original microphone and applies voice activity detection (VAD) algorithms to determine the presence of speech. It also uses echo cancellation and noise suppression techniques to ensure that the voice signal is clear and free from background noise. If the VAD algorithms detect ongoing speech activity, the system considers this as evidence that the original microphone is still the appropriate channel for the communication session.

As with the acoustic analysis of the handover microphone, the system may compare speech detected on the original microphone with a profile to determine whether the participant that is speaking is the participant of the communication session. In some examples, if voice is detected on the original microphone, and if the detected voice is the participant, the system may determine that the handover should be canceled or reversed.

Linguistic Analysis of Original Microphone. By continuing to analyze the linguistic content from the original microphone post-handover, the system can detect whether the pre-handover conversation persists on the original microphone-which may suggest that the user is still using the original microphone rather than transitioning to the handover microphone. This method involves parsing the speech for continuity of dialogue, relevance to the ongoing topic, and consistency in language use. If the conversation is found to be ongoing on the original device, the system may reverse the handover or alert the user to the situation, ensuring that the communication session remains coherent and uninterrupted. In some examples, the system employs speech recognition on the original microphone to transcribe the spoken words into text. It then uses discourse analysis techniques to track the conversation's topic and flow, ensuring that the subject matter remains consistent pre- and post-handover. If the system detects that the conversation on the original microphone is continuing without interruption, it may signal an inappropriate handover. In some examples, the system may utilize the speech-to-text, syntactic parsing, and semantic analysis algorithms described above.

Comparative Analysis of Features-Acoustic Feature Comparison. The system compares pre- and post-handover acoustic samples from both microphones. Example acoustic properties have been previously described with respect to other of the techniques. A distance between acoustic properties before and after the handover may be compared to a specified threshold. If the acoustic properties before the handover differ from the acoustic properties after the handover more than a threshold amount, this may trigger the system to reassess the handover decision, potentially reverting to the original microphone or engaging the user for direction.

In some examples, the system may determine if the post-handover voice matches the pre-handover voice within a certain confidence interval. For example, a voice print is captured before the handover and compared with a voice print captured after the handover to determine if they are a same voice. The voice prints for this technique, as well as other techniques described herein may be generated using utilizing Mel-Frequency Cepstral Coefficients, Linear Predictive Coding, Gaussian Mixture Models, I-Vectors, Deep Neural Networks, Recurrent Neural Networks (RNN), convolutional neural networks (CNNs), Long Short Term Memory networks, and the like. In some examples, the system may use machine learning models or other algorithms (such as those previously mentioned) to compare voice prints from the original and handover microphones. These models are trained to recognize individual voice characteristics and can detect subtle differences in the acoustic features. The comparison may calculate the probability of the post-handover voice matching the pre-handover voice, with a confidence threshold set to minimize false positives.

Comparative Analysis of Features—Linguistic Feature Comparison: The system may conduct a comparative analysis of linguistic content before and after the handover by examining the continuity of specific topics, the use of keywords, and the structure of the conversation. Discontinuities or abrupt changes in the linguistic flow may indicate an unsuccessful handover. The system then proceeds to correct the handover by either automatically switching back to the original device or consulting the user for their preferred course of action. In some examples, the system compares the linguistic content by employing algorithms that analyze the transcribed text for thematic consistency, lexical density, and syntactic complexity. Natural language understanding (NLU) techniques are used to ensure that the conversation's meaning and intent remain consistent across the handover. If the analysis reveals a significant deviation in the linguistic features, the system interprets this as a disruption in the conversation flow. Example algorithms may include those described previously, such as RNNs, CNNs, generative AI such as GPT, and the like.

Each of these methods provides a nuanced approach to managing handovers between wireless devices, ensuring that the transitions are based on a comprehensive understanding of both the acoustic environment and the linguistic context of the conversation. By implementing one or more of these methods, the invention significantly improves the reliability and user experience of wireless communication sessions.

In some examples, the above methods may be implemented separately or in combination. In some examples, combinations of the above techniques may be used together to determine whether the handover was proper or not. That is, two or more of the above techniques may be evaluated. Each technique may provide a result that is then weighted and summed. The weighted sum may be compared to a threshold to produce a decision as to whether the handover should proceed or be reversed. The weights as well as the threshold may be prespecified. In some examples, the weights and/or threshold may be set and/or adjusted using one or more machine learning algorithms such as neural networks, CNNs, RNNs, or the like based upon feedback as to whether a handover was correct.

Figure 1A:
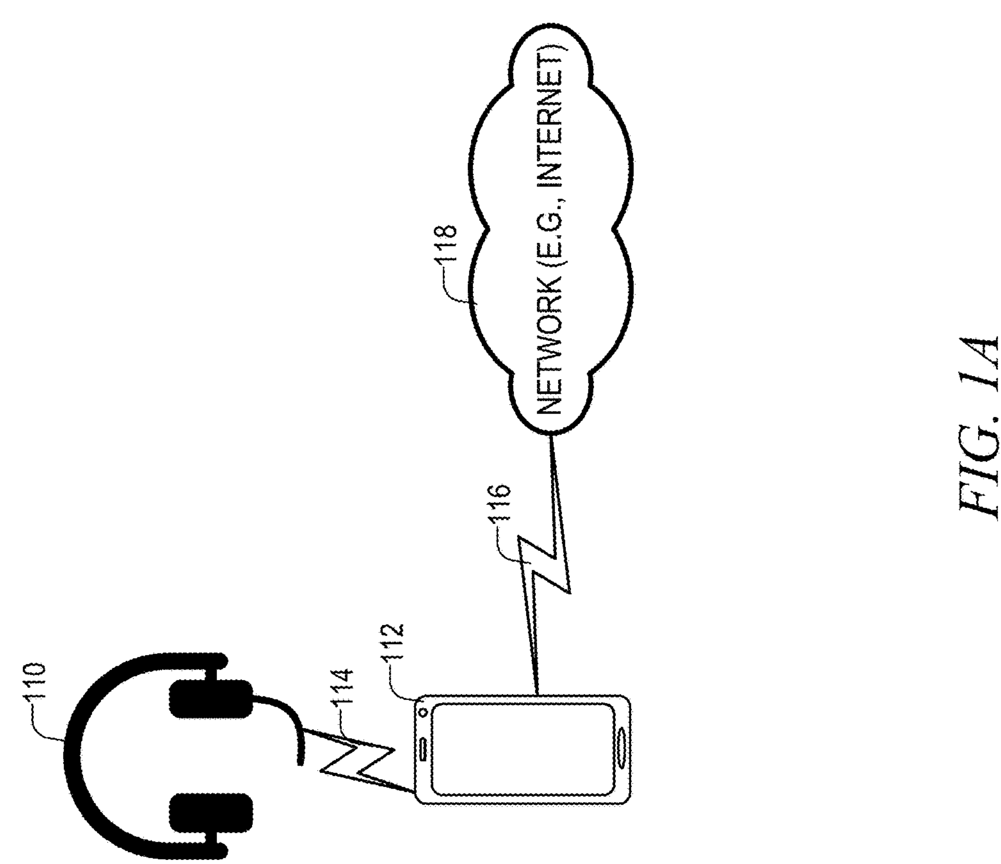

FIGS. 1A-1B illustrates a diagram of an inappropriate handover according to some examples of the present disclosure. FIG. 1A provides a visual representation of a communication setup in which a participant's computing device 112 is wirelessly connected to a wireless headset 110 via a wireless connection 114. The participant's computing device 112 is engaged in a communication session with a second participant, who is not depicted in the figure, over a network 118. This communication is facilitated by a connection 116 that transmits the participant's voice to the network 118 and receives the second participant's voice from the network 118, allowing for a two-way conversation through the wireless headset 110. Audio from a microphone on the wireless headset 110 is used as the participant's audio in the communication session.

FIG. 1B illustrates a subsequent event where the participant's computing device 112 has inadvertently handed over the communication session to the infotainment system 120 of a car. For example, perhaps a relative of the participant has arrived at their home and arrived within range of the participant's computing device 112. This unintended handover is established through a wireless connection 122 between the computing device 112 and the car's infotainment system 120. As a result of this unintended handover, the infotainment system 120 has become the new audio interface for the communication session, despite not being the participant's desired audio output device.

The figures collectively depict the initial intended communication setup and the subsequent unintended handover, highlighting the need for a system that can intelligently manage handovers to prevent such unintended switches between audio interfaces.

In the scenario depicted by FIG. 1B, the inadvertent handover of the communication session from the participant's computing device 112 to the car's infotainment system 120 may have occurred due to several technical reasons: Proximity-Based Handover Trigger: The computing device 112 may have been programmed to hand over the call to the infotainment system 120 when it detects a Bluetooth device within a certain proximity. If the participant enters the car with the computing device 112, the system might automatically initiate the handover without explicit confirmation from the user, assuming that the car's infotainment system 120 is the preferred audio interface. Default Device Configuration: The infotainment system 120 might have been set as a default device for all incoming and ongoing calls when connected. This configuration could lead to an automatic handover if the computing device 112 establishes a connection with the infotainment system 120, regardless of the participant's current usage of the wireless headset 110. Unintentional User Input: The participant may have unintentionally triggered the handover through an inadvertent input or gesture. Modern devices often have touch-sensitive surfaces or voice command recognition that could misinterpret user actions or commands, leading to an unintended switch of the audio output to the infotainment system 120. Software Glitch or Misconfiguration: A software error or misconfiguration in the computing device 112 or the infotainment system 120 could cause an unintended handover. This might happen due to a bug in the system's handover protocol, an erroneous setting, or a conflict between different software components responsible for managing audio outputs. Interference or Signal Issues: Wireless connections are susceptible to interference from various sources, which can disrupt the communication link. If the wireless connection 114 between the computing device 112 and the wireless headset 110 experiences interference, the system might mistakenly interpret this as a disconnection and automatically switch to an alternative audio interface, such as the infotainment system 120. Battery or Power Management: If the wireless headset 110 is low on battery, the computing device 112 might preemptively hand over the call to the infotainment system 120 to avoid call disruption. This handover could occur without the participant's knowledge if the power management settings are configured to prioritize continuity of the call over the current audio output device.

Figure 2:
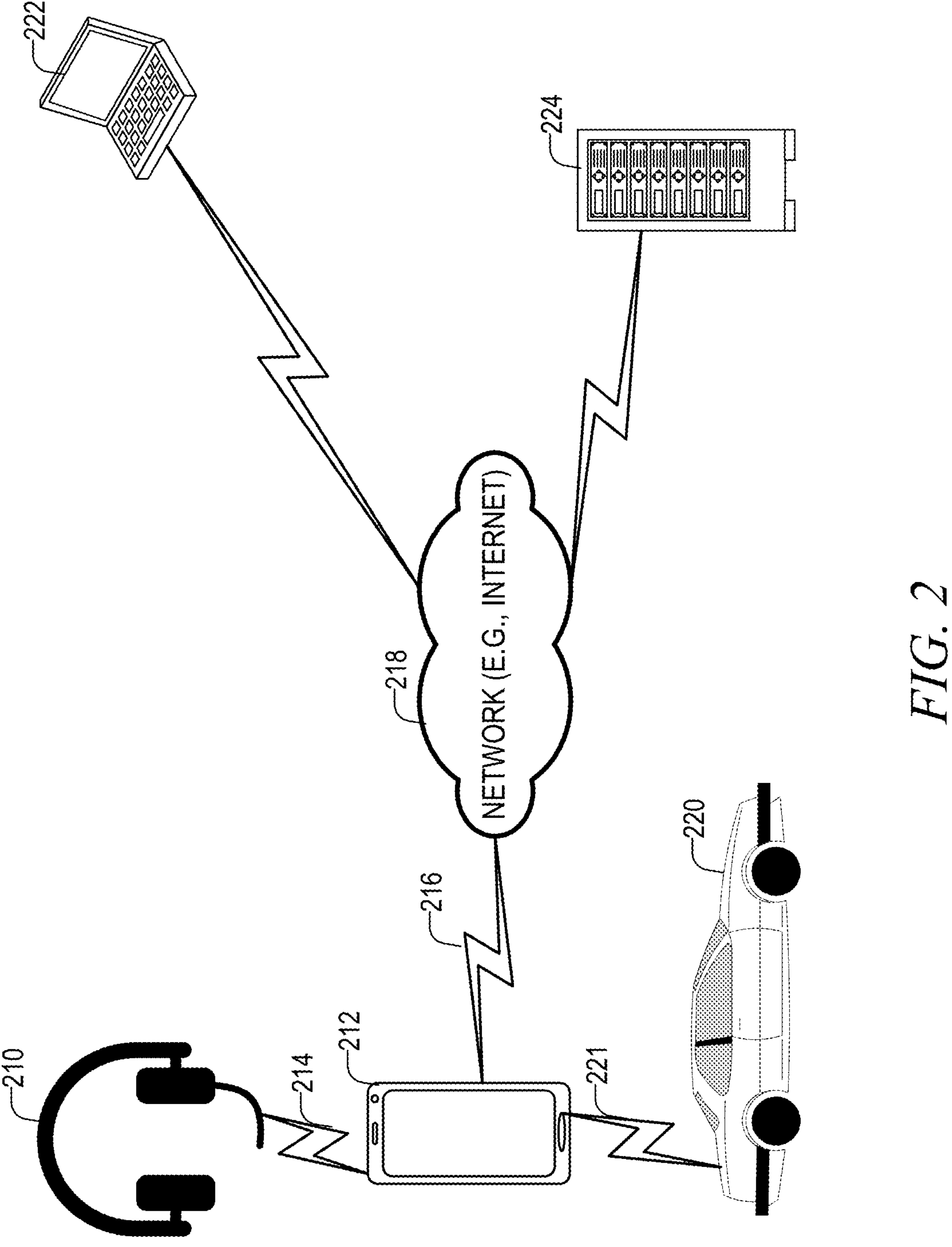
FIG. 2 illustrates a communication session and a plurality of wireless peripheral devices that may be utilized for the session according to some examples of the present disclosure.

FIG. 2 illustrates a communication session and a plurality of wireless peripheral devices that may be utilized for the session according to some examples of the present disclosure. FIG. 2 is a schematic representation of a communication system involving a participant's computing device 212 and multiple wireless peripheral devices, specifically a wireless headset 210 and a car infotainment system 220. The participant's computing device 212, depicted as a mobile device, is the primary device used to facilitate a network-based communication session. While two specific peripherals are illustrated in FIG. 2, one of ordinary skill in the art with the benefit of Applicant's disclosure will appreciate that other devices may be utilized. The wireless headset 210, as a wireless peripheral device, is connected to the participant's computing device 212 and serves as a personal audio interface for the participant to engage in the communication session. It provides the user with a private listening experience and the convenience of hands-free operation, which is particularly useful while the participant is mobile or in a public setting. The car infotainment system 220, another wireless peripheral device, may also be connected to the participant's computing device 212. It offers an alternative audio interface that integrates with the vehicle's built-in audio and control systems, allowing the participant to maintain the communication session in a hands-free manner while driving.

The participant's computing device 212 is capable of establishing a connection 216 over a network 218 to another participant's computing device 222. This connection enables the two participants to engage in a network-based communication session, which may be facilitated by server computing devices 224 associated with the network-based communication service. A network-based communication session is an interactive exchange of information between two or more participants over a digital network. This session can encompass various forms of communication, including voice calls, video conferencing, text messaging, or data sharing, and is facilitated by network infrastructure that connects the participants' devices, such as smartphones, computers, or specialized communication equipment. The underlying network can be the internet, a cellular network, a local area network (LAN), or any other type of digital communication network capable of transmitting data. During a network-based communication session, data packets are transmitted between the participants' devices, often passing through intermediate servers that manage the routing, quality of service, security, and other aspects of the communication. These sessions are typically established, maintained, and terminated using specific protocols that ensure the synchronization and coherence of the exchange, allowing participants to interact in real-time or near real-time, regardless of their geographical locations.

Server computing devices 224 can provide various communication services for the communication session such as establishment, management, and termination of network-communication sessions. This may include data encryption, quality of service enhancements, call routing, connection establishment, maintenance of call state, audio and/or video mixing and distribution, and the like. The server computing devices 224 may perform or assist in performing media processing tasks such as transcoding audio and/or video and mixing streams for conferencing. Server computing devices may enforce and manage Quality of Service (QOS) metrics by adjusting bitrates and prioritizing traffic to maintain call clarity even under network congestion. In some examples, the server computing devices 224, the participant's computing device 212, or a combination of the server computing devices 224 and the participant's computing device 212 may perform the audio processing employed herein to detect inadvertent handovers.

The system depicted in FIG. 2 is designed to allow seamless transitions between the wireless peripheral devices without interrupting the ongoing communication session. This capability ensures that the participant can switch between the wireless headset 210 and the car infotainment system 220 or vice versa as needed, based on their immediate environment and preferences, without any noticeable disruption to the call quality or connectivity.

In some examples, participant's computing device 212 may support simultaneous wireless connections with multiple peripheral devices. For example, the device may support a simultaneous wireless connection 221 between the participant's computing device 212 and car infotainment system 220 and wireless connection 214 between the headset 210 and the participant's computing device 212. In these examples, various methods of "soft" handover may be supported. In a "soft" handover, the audio stream of the peripheral device to which the call is being handed over to is available and in-use prior to the dis-establishment of the audio stream of the original wireless peripheral. This ensures instant switching between audio streams and no interruption. In other cases where simultaneous wireless links are not s supported, there may be a short delay as the device is handed over as the radio link of one wireless peripheral is disconnected and the radio link of a different peripheral is connected. In cases of soft handover, audio from the handover target peripheral device may be tested, using the methods described herein, prior to releasing the wireless connection of the original device. These examples may provide a more accurate analysis of the handover decision and be more seamless to the end user as it avoids disconnections caused by the original handover, and if need be, the reversing of the handover. In other examples, only a single wireless connection with a peripheral may be supported. In these examples, in order to deal with an inadvertent handover, the system may re-handover to the original device.

Figure 3:
FIG. 3 presents a logical diagram of a communication system that provides for enhanced peripheral handovers according to some examples of the present disclosure.
Figure 3:
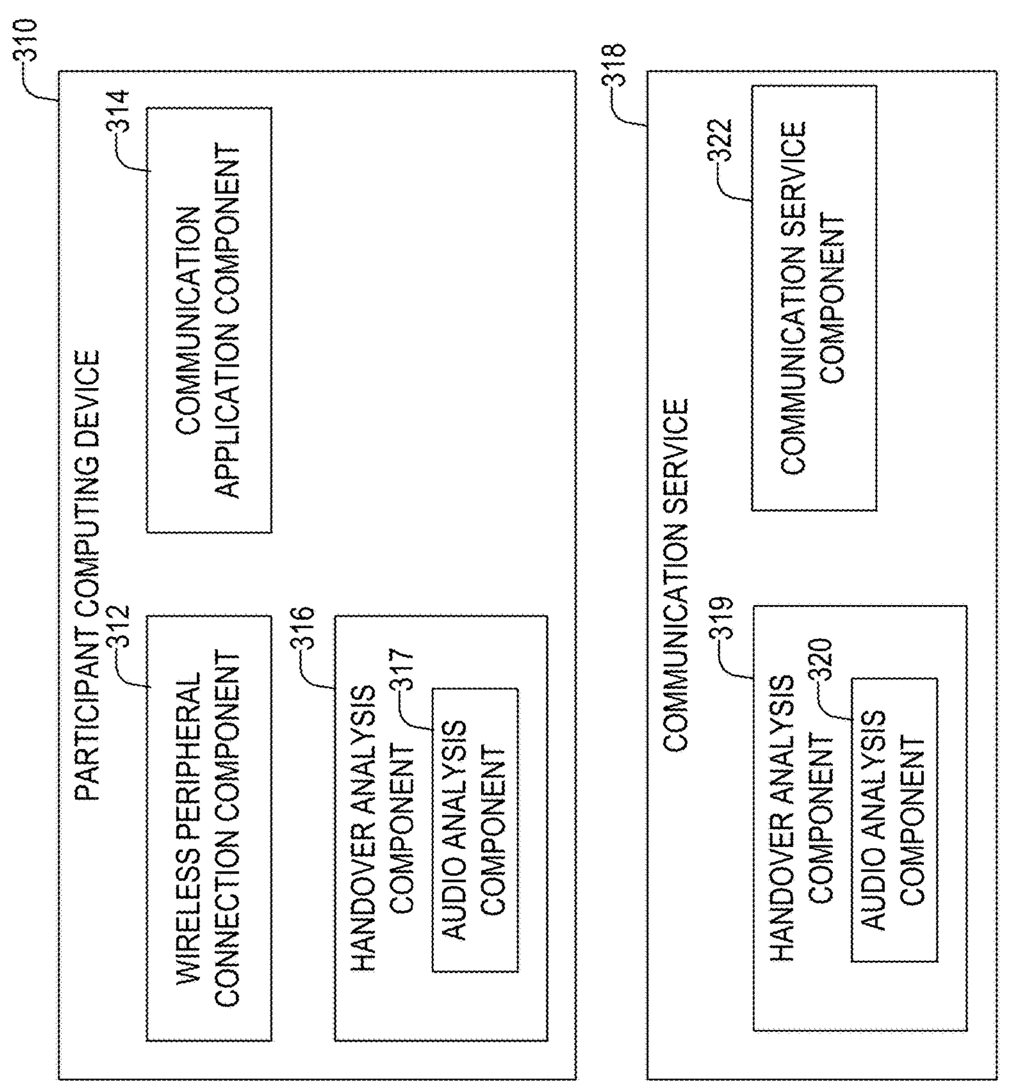

FIG. 3 presents a logical diagram of a communication system 300 that provides for enhanced peripheral handovers according to some examples of the present disclosure. Wireless peripheral connection component 312, may be responsible for connecting, disconnecting, and managing the handover of wireless links to peripheral devices. This component ensures that peripherals such as headsets or car infotainment systems maintain a robust connection with the user's computing device, facilitating a seamless audio experience by dynamically switching between peripherals based on the user's context and preferences. Handovers may be initiated based upon proximity, device configurations, user input, wireless signal metrics, and the like.

Handover analysis component 316 communicates with the wireless peripheral connection component 312 to monitor the status of completed or still in progress handovers. This component analyzes in-progress or just completed handovers to determine if a handover should be reversed or aborted. Such decisions may be based on the input from the audio analysis component 317, which conducts analysis of linguistic and/or acoustic features as previously described.

The audio analysis component 317 may provide input to the handover analysis component 316. The audio analysis component 317 may conduct linguistic and/or acoustic analysis of either or both of audio from the original or handover microphone as previously described.

As previously noted, the handover analysis component 316 may determine an inappropriate handover using one or more signals that an already performed handover should be reversed, or, a suggested handover should be canceled. The handover analysis component 316 utilizes the audio analysis conducted by the audio analysis component 317 to ensure the efficacy of handovers between wireless peripherals. In order to block or reverse a handover, the handover analysis component 316 may signal the wireless peripheral connection component 312.

The communication application component 314 may control scheduling, initiation, termination, user interface, media, and the like for a network-based communication session. The communication application component 314 may utilize audio from a wireless peripheral managed by the wireless peripheral connection component 312, integrating it into the communication session.

The communication service 318 may assist in scheduling, initiation, termination, providing the user interface, providing media, routing, and the like for the network-based communication session. In some examples, the communication service 318 provides the infrastructure and services for the network-based communication session. Within the communication service 318, the communication service component 322 mirrors the responsibilities of the communication application component 314, but from a server-side perspective. It manages the server's role in the communication session, ensuring that all server-side processes are optimized for efficiency and quality.

In some configurations, the system may include server-side counterparts to the client-side components, such as the handover analysis 319 and audio analysis component 320. These components perform similar functions to their client-side equivalents, the handover analysis component 316 and audio analysis component 317, but from within the server infrastructure. The handover analysis 319 and audio analysis components 320 may be used in the handover decision making as an alternative to the handover analysis component 316 and audio analysis component 317. A server-based approach may offer increased accuracy due to the ability to run more sophisticated models and analysis due to the increased processing power offered by a server. In other examples, some of the functions of the audio analysis components and the handover analysis components may be done on the client and some may be done on the server.

Figure 4:
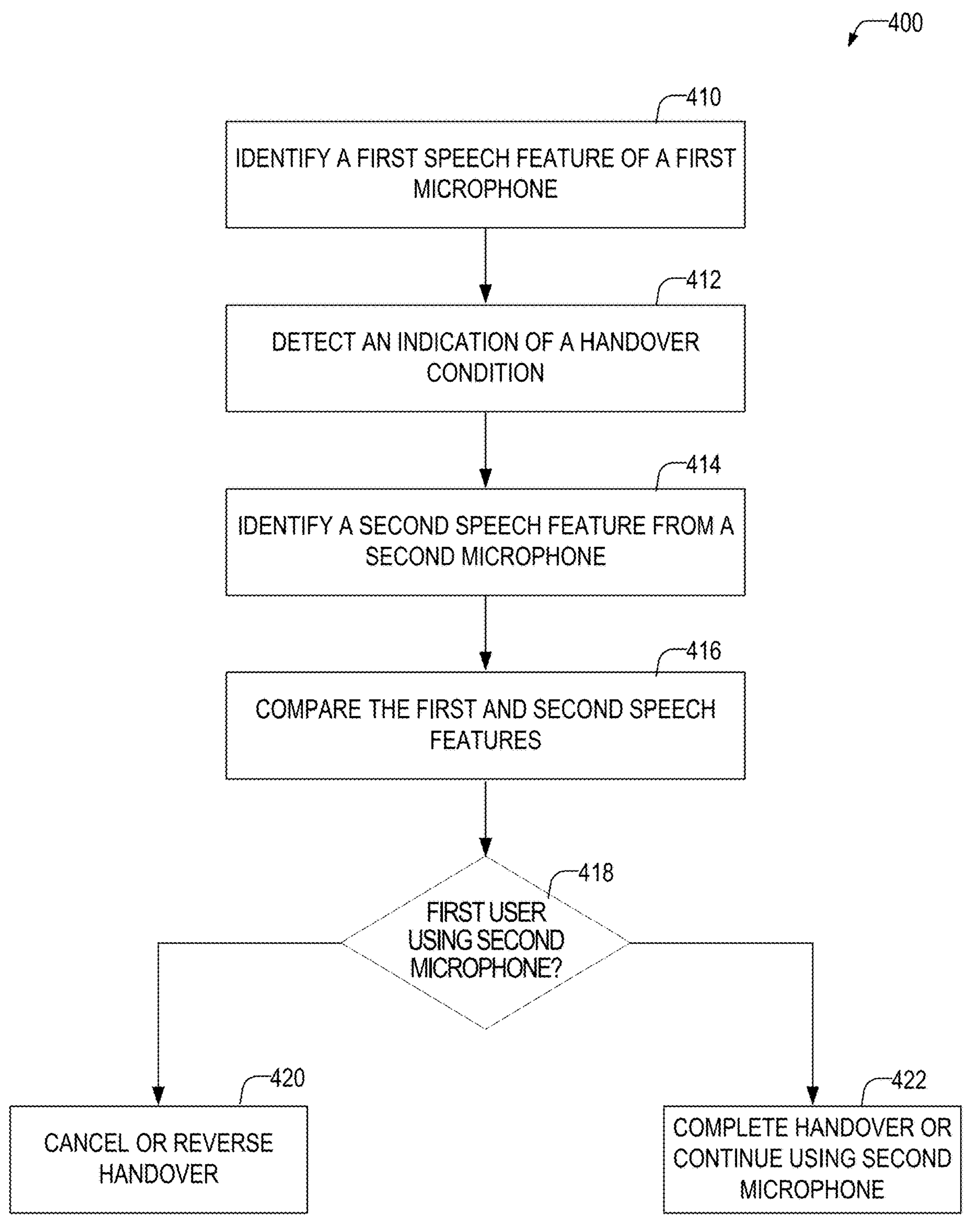
FIG. 4 depicts a flowchart of a method for managing handovers between wireless peripheral devices during a communication session according to some examples of the present disclosure.

FIG. 4 depicts a flowchart of a method 400 for managing handovers between wireless peripheral devices during a communication session according to some examples of the present disclosure. The method may be executed by one or more data processing systems equipped with one or more hardware processors, such as a participant computing device executing a communication application, or a server computing device of a communication service.

Operation 410 comprises the initial step of identifying a first speech feature from a first microphone. This microphone may be part of a first wireless peripheral such as a wireless headset that the user is currently employing for the communication session. The system analyzes the speech signals captured by the first microphone to extract speech features, which includes linguistic elements such as vocabulary and grammar, and/or acoustic elements like pitch and loudness. The linguistic analysis may involve parsing the speech for syntax and semantics, while the acoustic analysis may focus on the spectral content and temporal patterns of the sound wave. The acoustic features may include generating a voice print of the participant to identify the participant.

A voice print for speaker identification is constructed using a unique combination of an individual's speech characteristics. The pitch, or fundamental frequency may reflect the rate of vocal fold vibrations and varying with factors like gender and age. Timbre, another property, gives the voice its distinctive quality, influenced by the anatomical structure of the speaker's vocal tract. Formant frequencies, which are the resonance frequencies of the vocal tract, play a role in vowel sound production and are unique to each individual. The speaking rate, encompassing the speed of articulation and pauses, along with the intensity or loudness of the voice, can vary within utterances and across different speaking situations. Articulation, the clarity of word pronunciation, and prosody, which includes the rhythm, stress, and intonation of speech, add to the expressiveness and emotional tone of the voice. The melody of speech, with its pitch and intonation variations, can convey different meanings or emotions. Spectral features, analyzed through techniques like the Fast Fourier Transform, provide insight into the energy distribution across frequency bands. Voice quality attributes such as breathiness, nasality, and hoarseness can indicate the speaker's health or emotional state. Additionally, dialect and accent introduce regional or cultural speech variations, while phonetic patterns, the specific use of phonemes and their combinations, can be characteristic of an individual's speech habits. One or more of these properties may be used to form a voice print that may be used in speaker identification systems to verify identity.

In operation 412, the system detects an indication of a handover condition. In some examples, this condition is a signal for the system to consider switching the audio input from the first microphone to a second microphone. The indication may arise from various triggers, such as proximity sensors detecting the presence of another device, user input, or software protocols. In these examples, the detection is a prompt for the system to evaluate whether a handover is appropriate. In some examples, this indication coincides with the establishment of a radio link with a peripheral device corresponding to the second microphone. In yet other examples, this indication is a signal that a handover has already occurred—that is, the audio is now being provided by the second microphone. In these examples, the radio link with the peripheral device corresponding to the first microphone has been terminated upon establishment of a radio link with the peripheral device corresponding to the second microphone.

At operation 414, the system identifies a second speech feature from a second microphone, such as the handover microphone. This second microphone is integrated into another peripheral device, which could be a different type of headset, a smartwatch, or a car's infotainment system. The system analyzes the speech signals from the second microphone, extracting features in a manner similar to operation 410.

The first and second speech features are compared at operation 416. Acoustic features may be compared for consistency using one or more comparisons. The comparisons may be a simple comparison that determines whether the acoustic features differ by a threshold amount. If the acoustic features differ by a threshold amount or more, the system may conclude that the participant is not using the second microphone (e.g., the participant's voice is not in the second microphone). For example, a sudden drop in formant frequencies or a change in timbre might indicate that the user has moved away from the device.

In some examples, more complicated comparisons may be utilized instead, or in addition to threshold comparisons. For example, in some examples, the first and second speech features comprise voice prints determined from audio captured from the microphone used before the handover and audio captured from the microphone used after the handover. The comparison may comprise utilizing one or more voice print comparison algorithms to determine if the voice of the audio before the handover matches the one after the handover. Example algorithms may include gaussian mixture models, hidden Markov models, support vector machines, neural networks, dynamic time warping, i-vector systems, vector quantization, cosine distance metrics, probabilistic linear discriminant analysis, and Bayesian networks.

Other comparisons may be utilized, such as, for example, comparing the signal-to-noise ratio, clarity, and volume levels before and after the handover to ensure that the audio quality has not degraded, which could indicate a change in the communication environment or device; analyzing the rhythm, stress, and intonation patterns to confirm that the speech prosody is consistent, which would suggest that the speaker's emotional state or speaking style has not changed abruptly; comparing the rate of speech, including the duration of pauses and the speed of articulation, to ensure that the pace of the conversation remains steady; comparing the average length of utterances before and after the handover to detect any significant changes in speech patterns.

For linguistic features, in some examples, the system may determine one or more spoken words and determine whether the conversation is consistent from before and after the handover. For example, the first feature may be the content of the conversation a specified period of time before the handover and the second feature may be the content of the conversation a specified period of time after the handover. A machine-learning algorithm, such as a Natural Language Processing algorithm, such as a Generative Pre-Trained Transformer may be utilized to determine whether the conversation from after the handover is consistent with the conversation had before the handover. Consistency may include determining that the topics discussed pre-handover and post-handover (e.g., by determining the topics discussed using techniques such as Latent Dirichlet Allocation (LDA)) are the same; counting the occurrence of specific keywords or phrases before and after the handover to ensure that the conversation is centered around the same concepts; and/or using Natural Language Processing (NLP) techniques to measure the semantic similarity of the conversation segments. This can involve techniques like word embeddings to understand the context and meaning of words used.

At operation 418, the results of the comparison conducted at operation 416 are evaluated. If the comparison result indicates that the first user's speech is not being adequately captured by the second microphone, the system considers this an inappropriate handover.

At operation 420, if the evaluation of operation 418 indicates that the participant's speech is not being adequately captured by the second microphone, the system takes action to either block or reverse the handover. Should the comparison in operation 418 not indicate any issues with the handover, the system may proceed to operation 422. Here, the system may take no action (e.g., continue to use the second microphone), or else initiate the handover to the second microphone.

Figure 5:
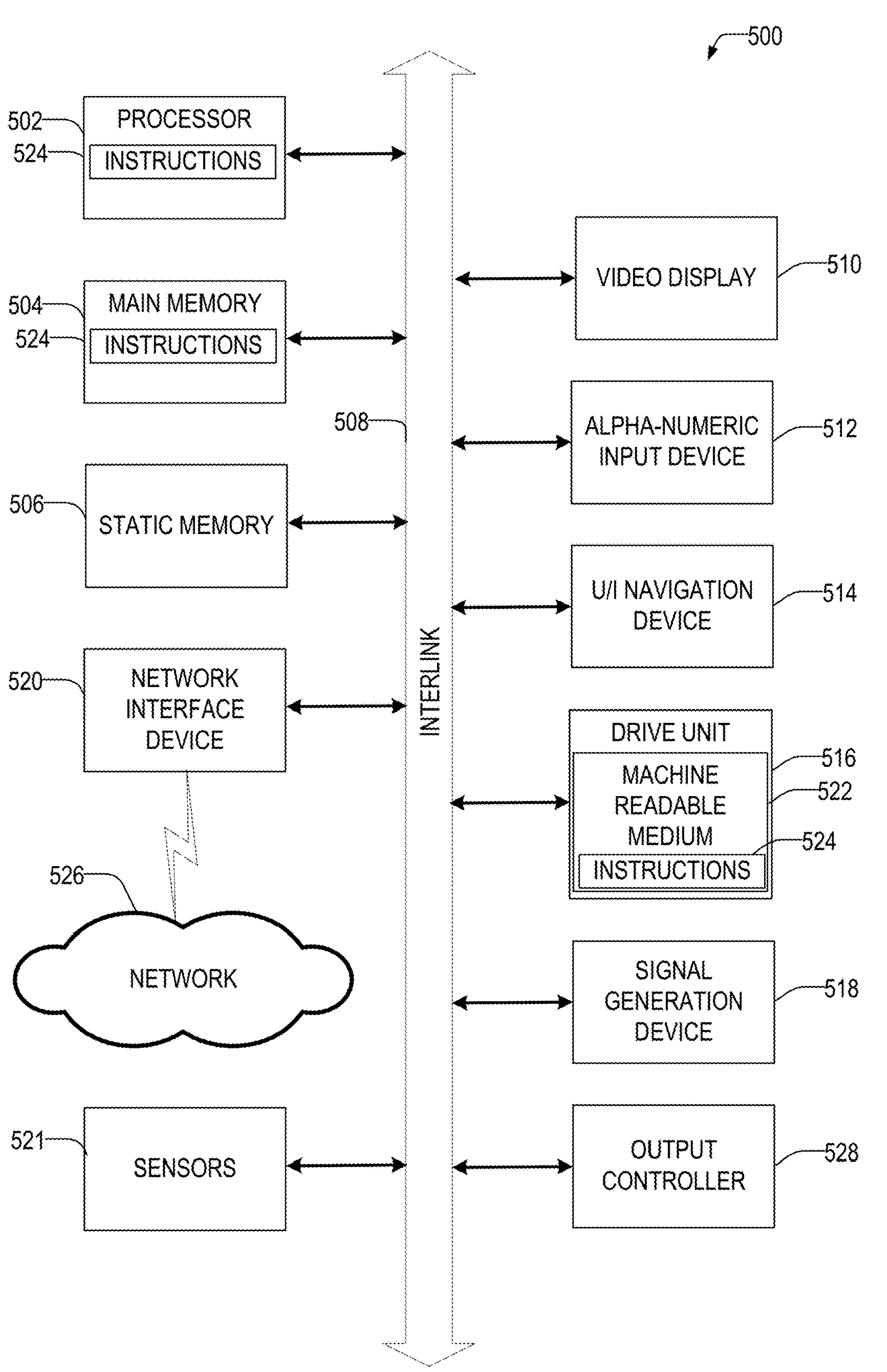
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 500 may be, or be configured to implement wireless peripheral devices, such as wireless peripheral devices such as wireless headset 110, 210; infotainment systems 120, 220; participant computing devices 112, 212, 222, 310; server computing devices 224, and communication service 318 (which may execute on one or more server computing devices). Machine 500 may be configured to implement the method of FIG. 4 and the components shown in FIG. 3. In some examples, machine 500 may be an example of a data processing system.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 500 may include one or more hardware processors, such as processor 502. Processor 502 may be a central processing unit (CPU), a graphics processing unit (GPU), a hardware processor core, or any combination thereof. Machine 500 may include a main memory 504 and a static memory 506, some or all of which may communicate with each other via an interlink (e.g., bus) 508. Examples of main memory 504 may include Synchronous Dynamic Random-Access Memory (SDRAM), such as Double Data Rate memory, such as DDR4 or DDR5. Interlink 508 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a method performed by a data processing system for preventing loss of audio in a communication session due to a wireless peripheral device handover, the method comprising: during the communication session and using a hardware processor: identifying a first speech feature captured by a first microphone currently used in the communication session by analyzing speech signals captured by the first microphone, the first speech feature being linguistic or acoustic features of speech of a first user, the first microphone belonging to a first peripheral device wirelessly connected to a computing device used by the first user to participate in the communication session, the linguistic features related to information contained in the speech and the acoustic features related to properties of a sound wave produced by the speech; detecting an indication of a handover condition indicating a handover from using the first microphone in the communication session to using a second microphone in the communication session, the second microphone belonging to a second peripheral device wirelessly connected to the computing device; and in response to the detected indication of the handover condition: identifying a second speech feature output from the second microphone by analyzing speech signals captured by the second microphone, the second speech feature output including linguistic or acoustic features; comparing the first speech feature with the second speech feature to produce a comparison result; and determining, based upon the comparison result, that the first user is not using the second microphone, and in response, causing the handover to be blocked or reversed by continuing to utilize the first microphone for the communication session, and not using the second microphone in the communication session.

In Example 2, the subject matter of Example 1 includes, wherein the first speech feature is a linguistic feature comprising a first transcription of words uttered by the first user and wherein the second speech feature is a linguistic feature comprising a second transcription of output from the second microphone and wherein comparing the first speech feature with the second speech feature comprises comparing the first and second transcriptions using a generative artificial intelligence model to determine if the second transcription is a continuation of a conversation of the first transcription.

In Example 3, the subject matter of Examples 1-2 includes, wherein the first and second speech features are acoustic features that comprise one or more of a tone, pitch, speaking rate, frequency, voice onset time, spectral distribution, or dynamic range and wherein comparing the first speech feature with the second speech feature comprises determining a difference between the first and second speech features and wherein determining, based upon the comparison result, that the voice of the first user is not present in the second microphone comprises determining that the difference between the first and second speech features exceeds a threshold difference.

In Example 4, the subject matter of Examples 1-3 includes, wherein detecting the handover condition indicating the handover of the first microphone to the second microphone comprises a notification that the handover already occurred.

In Example 5, the subject matter of Examples 1-4 includes, identifying linguistic features of a second user in the communication session from after the handover; and wherein determining, based upon the comparison result, that the voice of the first user is not present in the second microphone, comprises determining that the voice of the first user is not present in the second microphone based upon the comparison result and based upon identifying that the linguistic features of the second user indicate an inability to hear the first user.

In Example 6, the subject matter of Examples 1-5 includes, wherein detecting the handover condition indicating a handover of the first microphone to a second microphone comprises a soft handover where both the first microphone and the second microphone are both sending audio to the communication session and wherein blocking the handover or reversing the handover comprises terminating a link to the second microphone.

In Example 7, the subject matter of Examples 1-6 includes, wherein the method further comprises producing, from the first speech feature, a first speech profile of the first user and producing, from the second speech feature, a second speech profile; wherein comparing the first speech feature with the second speech feature to produce a comparison result comprises comparing the first speech profile and the second speech profile; and wherein determining, based upon the comparison result, that the first user is not using the second microphone comprises determining that the first speech profile does not match the second speech profile.

Example 8 is a computing device comprising: a processor; a memory, storing instructions which when performed by the processor, cause the processor to perform operations comprising: during a communication session: identifying a first speech feature captured by a first microphone currently used in the communication session by analyzing speech signals captured by the first microphone, the first speech feature being linguistic or acoustic features of speech of a first user, the first microphone belonging to a first peripheral device wirelessly connected to the computing device used by the first user to participate in the communication session, the linguistic features related to information contained in the speech and the acoustic features related to properties of a sound wave produced by the speech; detecting an indication of a handover condition indicating a handover from using the first microphone in the communication session to using a second microphone in the communication session, the second microphone belonging to a second peripheral device wirelessly connected to the computing device; and in response to the detected indication of the handover condition: identifying a second speech feature output from the second microphone by analyzing speech signals captured by the second microphone, the second speech feature output including linguistic or acoustic features; comparing the first speech feature with the second speech feature to produce a comparison result; and determining, based upon the comparison result, that the first user is not using the second microphone, and in response, causing the handover to be blocked or reversed by continuing to utilize the first microphone for the communication session, and not using the second microphone in the communication session.

In Example 9, the subject matter of Example 8 includes, wherein the first speech feature is a linguistic feature comprising a first transcription of words uttered by the first user and wherein the second speech feature is a linguistic feature comprising a second transcription of output from the second microphone and wherein the operations of comparing the first speech feature with the second speech feature comprises comparing the first and second transcriptions using a generative artificial intelligence model to determine if the second transcription is a continuation of a conversation of the first transcription.

In Example 10, the subject matter of Examples 8-9 includes, wherein the first and second speech features are acoustic features that comprise one or more of a tone, pitch, speaking rate, frequency, voice onset time, spectral distribution, or dynamic range and wherein the operations of comparing the first speech feature with the second speech feature comprises determining a difference between the first and second speech features and wherein the operations of determining, based upon the comparison result, that the voice of the first user is not present in the second microphone comprises determining that the difference between the first and second speech features exceeds a threshold difference.

In Example 11, the subject matter of Examples 8-10 includes, wherein the operations of detecting the handover condition indicating the handover of the first microphone to the second microphone comprises a notification that the handover already occurred.

In Example 12, the subject matter of Examples 8-11 includes, wherein the operations further comprise: identifying linguistic features of a second user in the communication session from after the handover; and wherein the operations of determining, based upon the comparison result, that the voice of the first user is not present in the second microphone, comprises determining that the voice of the first user is not present in the second microphone based upon the comparison result and based upon identifying that the linguistic features of the second user indicate an inability to hear the first user.

In Example 13, the subject matter of Examples 8-12 includes, wherein the operations of detecting the handover condition indicating a handover of the first microphone to a second microphone comprises a soft handover where both the first microphone and the second microphone are both sending audio to the communication session and wherein the operations of blocking the handover or reversing the handover comprises terminating a link to the second microphone.

In Example 14, the subject matter of Examples 8-13 includes, wherein the operations further comprises producing, from the first speech feature, a first speech profile of the first user and producing, from the second speech feature, a second speech profile; wherein the operations of comparing the first speech feature with the second speech feature to produce a comparison result comprises comparing the first speech profile and the second speech profile; and wherein the operations of determining, based upon the comparison result, that the first user is not using the second microphone comprises determining that the first speech profile does not match the second speech profile.

Example 15 is a machine-readable medium, storing instructions, which when executed by a machine, cause the machine to perform operations comprising: during a communication session: identifying a first speech feature captured by a first microphone currently used in the communication session by analyzing speech signals captured by the first microphone, the first speech feature being linguistic or acoustic features of speech of a first user, the first microphone belonging to a first peripheral device wirelessly connected to a computing device used by the first user to participate in the communication session, the linguistic features related to information contained in the speech and the acoustic features related to properties of a sound wave produced by the speech; detecting an indication of a handover condition indicating a handover from using the first microphone in the communication session to using a second microphone in the communication session, the second microphone belonging to a second peripheral device wirelessly connected to the computing device; and in response to the detected indication of the handover condition: identifying a second speech feature output from the second microphone by analyzing speech signals captured by the second microphone, the second speech feature output including linguistic or acoustic features; comparing the first speech feature with the second speech feature to produce a comparison result; and determining, based upon the comparison result, that the first user is not using the second microphone, and in response, causing the handover to be blocked or reversed by continuing to utilize the first microphone for the communication session, and not using the second microphone in the communication session.

In Example 16, the subject matter of Example 15 includes, wherein the first speech feature is a linguistic feature comprising a first transcription of words uttered by the first user and wherein the second speech feature is a linguistic feature comprising a second transcription of output from the second microphone and wherein the operations of comparing the first speech feature with the second speech feature comprises comparing the first and second transcriptions using a generative artificial intelligence model to determine if the second transcription is a continuation of a conversation of the first transcription.

In Example 17, the subject matter of Examples 15-16 includes, wherein the first and second speech features are acoustic features that comprise one or more of a tone, pitch, speaking rate, frequency, voice onset time, spectral distribution, or dynamic range and wherein the operations of comparing the first speech feature with the second speech feature comprises determining a difference between the first and second speech features and wherein the operations of determining, based upon the comparison result, that the voice of the first user is not present in the second microphone comprises determining that the difference between the first and second speech features exceeds a threshold difference.

In Example 18, the subject matter of Examples 15-17 includes, wherein the operations of detecting the handover condition indicating the handover of the first microphone to the second microphone comprises a notification that the handover already occurred.

In Example 19, the subject matter of Examples 15-18 includes, wherein identifying linguistic features of a second user in the communication session from after the handover; and wherein the operations of determining, based upon the comparison result, that the voice of the first user is not present in the second microphone comprises determining that the voice of the first user is not present in the second microphone based upon the comparison result and based upon identifying that the linguistic features of the second user indicate an inability to hear the first user.

In Example 20, the subject matter of Examples 15-19 includes, wherein the operations of detecting the handover condition indicating a handover of the first microphone to a second microphone comprises a soft handover where both the first microphone and the second microphone are both sending audio to the communication session and wherein blocking the handover or reversing the handover comprises terminating a link to the second microphone.

In Example 21, the subject matter of Examples 15-20 includes, wherein the operations further comprises producing, from the first speech feature, a first speech profile of the first user and producing, from the second speech feature, a second speech profile; wherein the operations of comparing the first speech feature with the second speech feature to produce a comparison result comprises comparing the first speech profile and the second speech profile; and wherein the operations of determining, based upon the comparison result, that the first user is not using the second microphone comprises determining that the first speech profile does not match the second speech profile.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method performed by a data processing system for preventing loss of audio in a communication session due to a wireless peripheral device handover, the method comprising:

during the communication session and using a hardware processor:

identifying a first speech feature captured by a first microphone currently used in the communication session by analyzing speech signals captured by the first microphone, the first speech feature being linguistic or acoustic features of speech of a first user, the first microphone coupled to a computing device used by the first user to participate in the communication session, the linguistic features related to information contained in the speech and the acoustic features related to properties of a sound wave produced by the speech;

detecting an indication of a handover condition indicating a handover from using the first microphone in the communication session to using a second microphone in the communication session, the second microphone belonging to a second peripheral device wirelessly connected to the computing device; and in response to the detected indication of the handover condition:

identifying a second speech feature output from the second microphone by analyzing speech signals captured by the second microphone, the second speech feature output including linguistic or acoustic features;

comparing the first speech feature with the second speech feature to produce a comparison result regarding whether the second speech feature corresponds to the first user; and determining, that the first user is not using the second microphone based upon the comparison result indicating that the second speech feature does not correspond to the first user, and in response, causing the handover to be blocked or reversed by continuing to utilize the first microphone for the communication session, and not using the second microphone in the communication session.

2. The method of claim 1, wherein the first speech feature is a linguistic feature comprising a first transcription of words uttered by the first user and wherein the second speech feature is a linguistic feature comprising a second transcription of output from the second microphone and wherein comparing the first speech feature with the second speech feature comprises comparing the first and second transcriptions using a generative artificial intelligence model to determine if the second transcription is a continuation of a conversation of the first transcription.

3. The method of claim 1, wherein the first and second speech features are acoustic features that comprise one or more of a tone, pitch, speaking rate, frequency, voice onset time, spectral distribution, or dynamic range and wherein comparing the first speech feature with the second speech feature comprises determining a difference between the first and second speech features and wherein determining, that the first user is not using the second microphone based upon the comparison result comprises determining that the difference between the first and second speech features exceeds a threshold difference.

4. The method of claim 1, wherein detecting the handover condition indicating the handover of the first microphone to the second microphone comprises a notification that the handover already occurred.

5. The method of claim 1, further comprising:

identifying linguistic features of a second user in the communication session from after the handover; and wherein determining, that the first user is not using the second microphone based upon the comparison result comprises determining that a voice of the first user is not present in the second microphone based upon the comparison result and based upon identifying that the linguistic features of the second user indicate an inability to hear the first user.

6. The method of claim 1, wherein detecting the handover condition indicating a handover of the first microphone to a second microphone comprises a soft handover where both the first microphone and the second microphone are both sending audio to the communication session and wherein blocking the handover or reversing the handover comprises terminating a link to the second microphone.

7. The method of claim 1, wherein the method further comprises producing, from the first speech feature, a first speech profile of the first user and producing, from the second speech feature, a second speech profile;

wherein determining, that the first user is not using the second microphone based upon the comparison result comprises comparing the first speech profile and the second speech profile; and wherein determining, that the first user is not using the second microphone based upon the comparison result indicating that the second speech feature does not correspond to the first user comprises determining that the first speech profile does not match the second speech profile.

8. A computing device comprising:

a processor;

a memory, storing instructions which when performed by the processor, cause the processor to perform operations comprising:

during a communication session:

identifying a first speech feature captured by a first microphone currently used in the communication session by analyzing speech signals captured by the first microphone, the first speech feature being linguistic or acoustic features of speech of a first user, the first microphone coupled to the computing device used by the first user to participate in the communication session, the linguistic features related to information contained in the speech and the acoustic features related to properties of a sound wave produced by the speech;

detecting an indication of a handover condition indicating a handover from using the first microphone in the communication session to using a second microphone in the communication session, the second microphone belonging to a second peripheral device wirelessly connected to the computing device; and in response to the detected indication of the handover condition:

identifying a second speech feature output from the second microphone by analyzing speech signals captured by the second microphone, the second speech feature output including linguistic or acoustic features;

comparing the first speech feature with the second speech feature to produce a comparison result regarding whether the second speech feature corresponds to the first user; and determining, that the first user is not using the second microphone based upon the comparison result indicating that the second speech feature does not correspond to the first user, and in response, causing the handover to be blocked or reversed by continuing to utilize the first microphone for the communication session, and not using the second microphone in the communication session.

9. The computing device of claim 8, wherein the first speech feature is a linguistic feature comprising a first transcription of words uttered by the first user and wherein the second speech feature is a linguistic feature comprising a second transcription of output from the second microphone and wherein the operations of comparing the first speech feature with the second speech feature comprises comparing the first and second transcriptions using a generative artificial intelligence model to determine if the second transcription is a continuation of a conversation of the first transcription.

10. The computing device of claim 8, wherein the first and second speech features are acoustic features that comprise one or more of a tone, pitch, speaking rate, frequency, voice onset time, spectral distribution, or dynamic range and wherein the operations of comparing the first speech feature with the second speech feature determining a difference between the first and second speech features and wherein determining, that the first user is not using the second microphone based upon the comparison result comprises determining that the difference between the first and second speech features exceeds a threshold difference.

11. The computing device of claim 8, wherein the operations of detecting the handover condition indicating the handover of the first microphone to the second microphone comprises a notification that the handover already occurred.

12. The computing device of claim 8, wherein the operations further comprise:

identifying linguistic features of a second user in the communication session from after the handover; and wherein determining, that the first user is not using the second microphone based upon the comparison result comprises determining that a voice of the first user is not present in the second microphone based upon the comparison result and based upon identifying that the linguistic features of the second user indicate an inability to hear the first user.

13. The computing device of claim 8, wherein the operations of detecting the handover condition indicating a handover of the first microphone to a second microphone comprises a soft handover where both the first microphone and the second microphone are both sending audio to the communication session and wherein the operations of blocking the handover or reversing the handover comprises terminating a link to the second microphone.

14. The computing device of claim 8, wherein the operations further comprises producing, from the first speech feature, a first speech profile of the first user and producing, from the second speech feature, a second speech profile;

wherein determining, that the first user is not using the second microphone based upon the comparison result comprises comparing the first speech profile and the second speech profile; and wherein determining, that the first user is not using the second microphone based upon the comparison result indicating that the second speech feature does not correspond to the first user comprises determining that the first speech profile does not match the second speech profile.

15. A non-transitory machine-readable medium, storing instructions, which when executed by a machine, cause the machine to perform operations comprising:

during a communication session:

identifying a first speech feature captured by a first microphone currently used in the communication session by analyzing speech signals captured by the first microphone, the first speech feature being linguistic or acoustic features of speech of a first user, the first microphone coupled to a computing device used by the first user to participate in the communication session, the linguistic features related to information contained in the speech and the acoustic features related to properties of a sound wave produced by the speech;

detecting an indication of a handover condition indicating a handover from using the first microphone in the communication session to using a second microphone in the communication session, the second microphone belonging to a second peripheral device wirelessly connected to the computing device; and in response to the detected indication of the handover condition:

identifying a second speech feature output from the second microphone by analyzing speech signals captured by the second microphone, the second speech feature output including linguistic or acoustic features;

comparing the first speech feature with the second speech feature to produce a comparison result regarding whether the second speech feature corresponds to the first user; and determining, that the first user is not using the second microphone based upon the comparison result indicating that the second speech feature does not correspond to the first user, and in response, causing the handover to be blocked or reversed by continuing to utilize the first microphone for the communication session, and not using the second microphone in the communication session.

16. The non-transitory machine-readable medium of claim 15, wherein the first speech feature is a linguistic feature comprising a first transcription of words uttered by the first user and wherein the second speech feature is a linguistic feature comprising a second transcription of output from the second microphone and wherein the operations of comparing the first speech feature with the second speech feature comprises comparing the first and second transcriptions using a generative artificial intelligence model to determine if the second transcription is a continuation of a conversation of the first transcription.

17. The non-transitory machine-readable medium of claim 15, wherein the first and second speech features are acoustic features that comprise one or more of a tone, pitch, speaking rate, frequency, voice onset time, spectral distribution, or dynamic range and wherein the operations of comparing the first speech feature with the second speech feature comprises determining a difference between the first and second speech features and wherein determining, that the first user is not using the second microphone based upon the comparison result comprises determining that the difference between the first and second speech features exceeds a threshold difference.

18. The non-transitory machine-readable medium of claim 15, wherein the operations of detecting the handover condition indicating the handover of the first microphone to the second microphone comprises a notification that the handover already occurred.

19. The non-transitory machine-readable medium of claim 15, wherein identifying linguistic features of a second user in the communication session from after the handover; and wherein determining, that the first user is not using the second microphone based upon the comparison result comprises determining that a voice of the first user is not present in the second microphone based upon the comparison result and based upon identifying that the linguistic features of the second user indicate an inability to hear the first user.

20. The non-transitory machine-readable medium of claim 15, wherein the operations of detecting the handover condition indicating a handover of the first microphone to a second microphone comprises a soft handover where both the first microphone and the second microphone are both sending audio to the communication session and wherein blocking the handover or reversing the handover comprises terminating a link to the second microphone.

* * * * *